(12) United States Patent
Sugiura et al.

(10) Patent No.: US 8,500,198 B2
(45) Date of Patent: Aug. 6, 2013

(54) VEHICLE SEAT COVER

(75) Inventors: Tomohiro Sugiura, Toyota (JP); Kunio Nishiyama, Okazaki (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 198 days.

(21) Appl. No.: 12/844,970

(22) Filed: Jul. 28, 2010

(65) Prior Publication Data

US 2011/0043013 A1 Feb. 24, 2011

(30) Foreign Application Priority Data

Aug. 21, 2009 (JP) ................................. 2009-191734

(51) Int. Cl.
*A47C 31/11* (2006.01)
(52) U.S. Cl.
USPC ............... 297/228.13; 297/228.1; 297/228.11
(58) Field of Classification Search
USPC .............................. 297/228.1, 228.11, 228.13
See application file for complete search history.

(56) References Cited

U.S. PATENT DOCUMENTS

| | | | | |
|---|---|---|---|---|
| 2,286,171 | A | | 6/1942 | Krasnov et al. |
| 2,400,731 | A | * | 5/1946 | Armstrong ........................ 5/500 |
| 2,667,211 | A | | 1/1954 | Krasnov et al. |
| 2,921,625 | A | | 1/1960 | Krasnov et al. |
| 3,174,797 | A | | 3/1965 | Neufeld |
| 4,047,756 | A | | 9/1977 | Ney |
| 4,396,227 | A | * | 8/1983 | Neilson .................... 297/228.11 |
| 5,265,933 | A | * | 11/1993 | Croshaw .................... 297/228.1 |
| 5,295,732 | A | | 3/1994 | Boisset |
| 5,716,096 | A | | 2/1998 | Pryde et al. |
| 5,966,759 | A | * | 10/1999 | Sanders et al. ..................... 5/499 |
| 6,948,207 | B2 | * | 9/2005 | Daly ................................ 5/738 |
| 7,255,405 | B2 | * | 8/2007 | Kodera et al. ............ 297/452.62 |
| 7,488,036 | B2 | * | 2/2009 | Tache ....................... 297/228.13 |
| 7,618,092 | B2 | | 11/2009 | Yasuda et al. |
| 2002/0043834 | A1 | * | 4/2002 | Jackson et al. ............. 297/228.1 |
| 2010/0060069 | A1 | | 3/2010 | Hoshina et al. |

FOREIGN PATENT DOCUMENTS

| | | |
|---|---|---|
| DE | 000001989308 | 7/1968 |
| DE | 2546432 | 4/1976 |
| DE | 102005029642 | 1/2006 |
| FR | 2881384 | 8/2006 |
| JP | 5-208080 | 8/1993 |
| JP | 2001-8793 | 1/2001 |

* cited by examiner

*Primary Examiner* — Peter Brown
(74) *Attorney, Agent, or Firm* — Greenblum & Bernstein, P.L.C.

(57) ABSTRACT

A vehicle seat cover including separately formed parts that are configured to wrap a seat main body and are joined by a joining unit, wherein a band-shaped covering member, which can visually cover a joining state by the joining unit, is disposed in an annular shape, the covering member provided to overhang in an inner side direction of the annular shape, wherein the joining unit is disposed in an inner side position of the annular shape of the covering member along a position in which the covering member is disposed, and wherein in the covering member, an inserting structure is formed into which a string-shaped member can be inserted into a part that overhangs in the inner side direction of the annular shape along an longitudinal direction of the covering member, and the string-shaped member inserted into the inserting structure is tightened.

9 Claims, 4 Drawing Sheets

VEHICLE SEAT COVER

CROSS REFERENCE TO RELATED APPLICATION

The present application claims priority from Japanese Patent Application No. 2009-191734, which was filed on Aug. 21, 2009, the disclosure of which is herein incorporated by reference in its entirety.

TECHNICAL FIELD

The apparatuses and devices consistent with the present invention relate to a vehicle seat cover. More specifically, the present invention relates to a vehicle seat cover structure configured to wrap a seat main body and includes separately formed parts joined by a joining unit when mounted on the seat main body.

BACKGROUND

A related art vehicle seat cover structure is, for example, disclosed in the following Patent Document 1. That is, the following Patent Document 1 discloses a bag-shape seat cover for wrapping a pad of the seat back, the seat cover having an opening in a lower part thereof and is formed with a slit which can be opened and closed by a slide fastener in an up and down direction from the opening. The related art seat cover can be easily mounted on the pad by covering the pad when the slit is an open state and closing the slit by the slide fastener. In the related art seat cover, a pair of engaging fastener pieces is sewn onto each opposing end edge portion of cover pieces formed separately in the left and right sides of the slit. Furthermore, the end edge portions of the cover pieces overhang from the places where fastener pieces are sewn and are folded back so as to cover the fastener pieces. That is, by covering each of the fastener pieces by the overhanging, there is an improvement in appearance when the seat cover is mounted.
[Patent Document 1] JP-A-2001-8793

SUMMARY

However, in the structure of the related art, since the fastener pieces and the cover pieces folded back and overlap are concentrated in the places where the fastener pieces are sewn, in practice, the overhanging portion easily peel off back and the fastener pieces are exposed, and thus the appearance is deteriorated.

Thus, an object of the present invention is to surely cover and conceal a joining state by a joining unit in a vehicle seat cover that includes separately formed parts joined by the joining unit when mounted on a seat main body.

The present invention adopts the following aspect to solve the above-mentioned problem. That is, according to an illustrative aspect of the present invention, there is provided a vehicle seat cover including separately formed parts that are configured to wrap a seat main body and are joined by a joining unit when mounted on the seat main body, wherein a band-shaped covering member, which can visually cover a joining state by the joining unit, is disposed in an annular shape with ends in which edges of the seat cover are end portions on the surface of the seat cover, the covering member provided to overhang in an inner side direction of the annular shape, wherein the joining unit is disposed in an inner side position of the annular shape of the covering member along a position in which the covering member is disposed, and wherein in the covering member, an inserting structure is formed into which a string-shaped member can be inserted into a part that overhangs in the inner side direction of the annular shape along an longitudinal direction of the covering member, and the string-shaped member inserted into the inserting structure is tightened.

Further, according to another illustrative aspect of the present invention, there is provided a vehicle seat cover comprising: a first cover portion that covers a part of a seat main body; a second cover portion that covers a part of the seat main body, the second cover portion separately formed from the first cover portion; a joining unit that is configured to join or separate the first cover portion and the second cover portion; and a covering member that is configured to cover a joining state of the first cover portion and the second cover portion, the covering member disposed in an annular shape with ends in which edges of the seat cover are end portions of the covering member, the covering member configured to overhang in an inner side direction of the annular shape; wherein the joining unit is disposed in an inner side position of the annular shape of the covering member along a position in which the covering member is disposed, wherein the covering member has an inserting structure into which a string-shaped member is inserted into, the inserting structure has a part that overhangs in the inner side direction of the annular shape along an longitudinal direction of the covering member, and wherein the covering member moves in a position in which the joining state is covered when the string-shaped member inserted into the inserting structure is tightened.

According to the vehicle seat cover, after parts, which cover a seat main body and are formed separately, are a joining state by a joining unit, by tightening a string-shaped member inserted into an inserting structure of a covering member, the covering member can surely cover the joining unit. That is, since the covering member is disposed in the annular shape with ends in which end edges of the seat cover are made as end portions on the surface of the seat cover, when the string-shaped member inserted into the inserting structure is tightened, due to the tightened string-shaped member, a force in a inner side direction of the annular shape acts over the whole length of the covering member. As a result, the covering member covers the joining unit disposed at the inner side of the annular shape of the covering member along a position in which the covering member is disposed and is maintained in a state of overhanging in the inner direction of the annular shape of the covering member. Thus, it is possible to surely cover the joining unit.

According to the vehicle seat cover structure of the present invention, it is possible to surely cover the joining state by the joining unit in the seat cover including separately formed parts which are joined by the joining unit when mounted on the seat main body.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, an exemplary embodiment of the present invention will be described with reference to the drawings.

Figure 1:
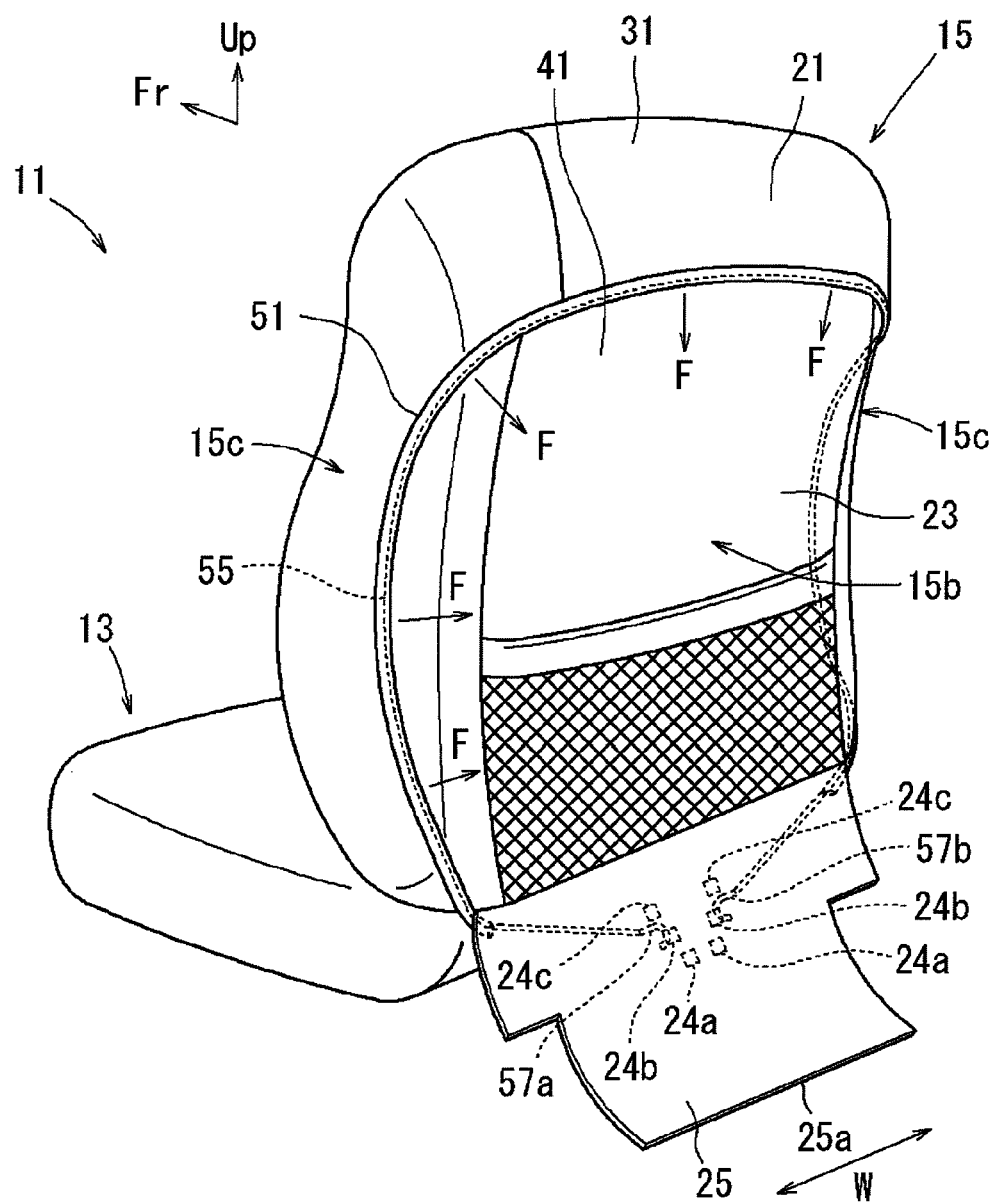
FIG. 1 is a perspective view of a vehicle seat with a seat cover mounted thereon according to an exemplary embodiment of the present invention.

A seat 11 shown in FIG. 1 is a seat mounted on a vehicle such as a car and includes a seat cushion 13 which is a sitting surface, a seat back 15 which is a back, and a head rest (not shown). A seat main body of the seat 11 is mainly constituted by a seat frame (not shown) which is a framework and a seat pad 19 (see FIG. 4) which covers the seat frame to form an outline of the seat 11 and is formed of a foam urethane or the like, without requiring a change from the related art. In the exemplary embodiment of the present invention, the present invention is applied to a seat cover 21 for wrapping the seat main body in the seat back 15. Furthermore, Fr and Up shown by arrows in each drawing respectively indicate a front part and an upper part of the seat 11, and W indicates a width direction of the seat 11.

Figure 2:
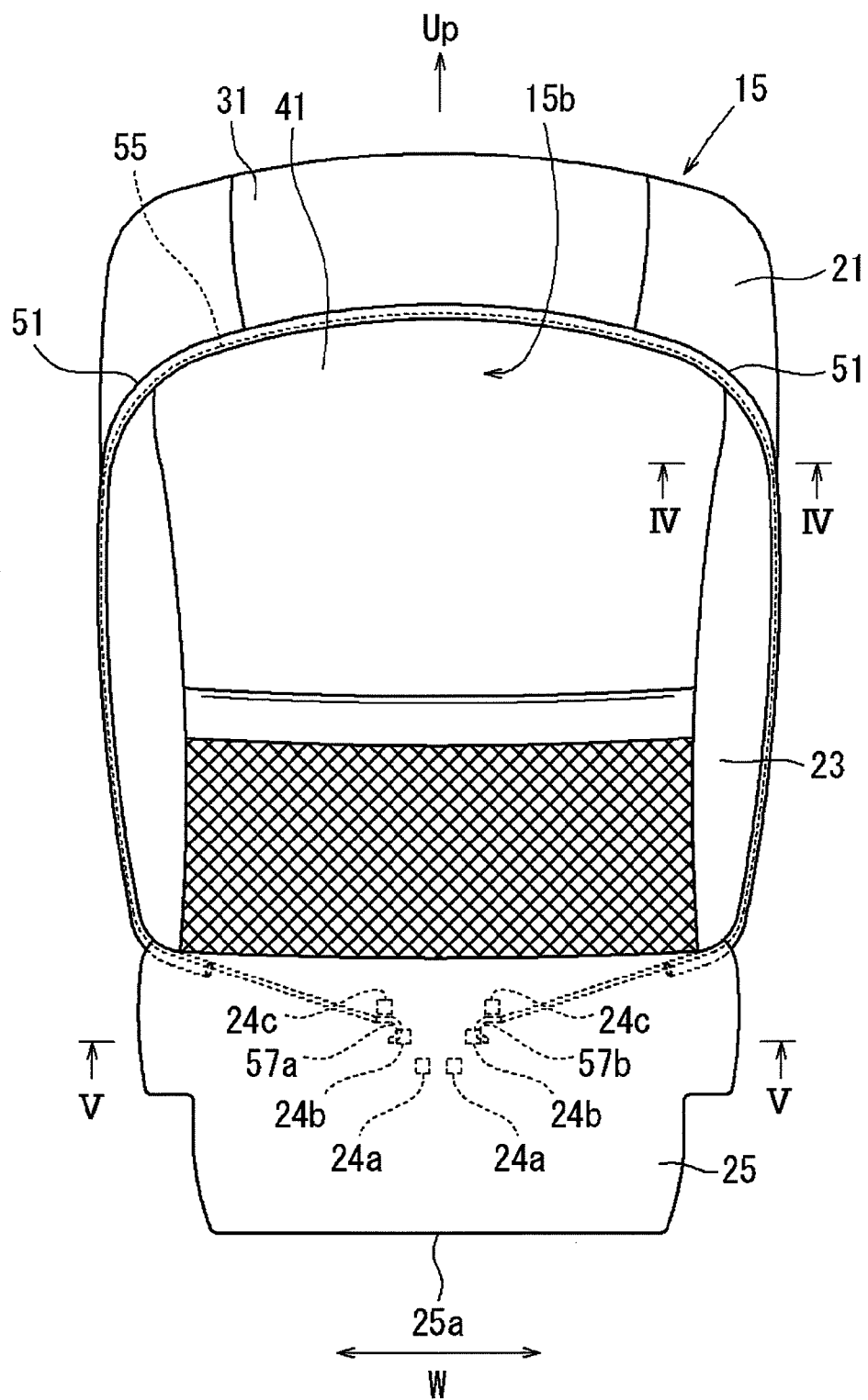
FIG. 2 is a rear view of the vehicle seat shown in FIG. 1.

As shown in FIGS. 1 and 2, the seat cover 21 includes a cover main body portion 23, which constitutes outer surfaces of a front surface, a rear surface 15b and a rail portion 15c of the seat back 15 in a state of being mounted on the seat back 15, and a lower band portion 25 extending from the lower end portion of the rear side of the cover main body portion 23. Furthermore, in FIG. 1, in order to clearly and easily show the structure of the seat cover 21, the lower band portion 25 is shown in a state of being unfolded backward, but when actual mounted, a front end portion 25a is wound in the lower direction of the seat cushion 13 and is engaged.

Figure 3:
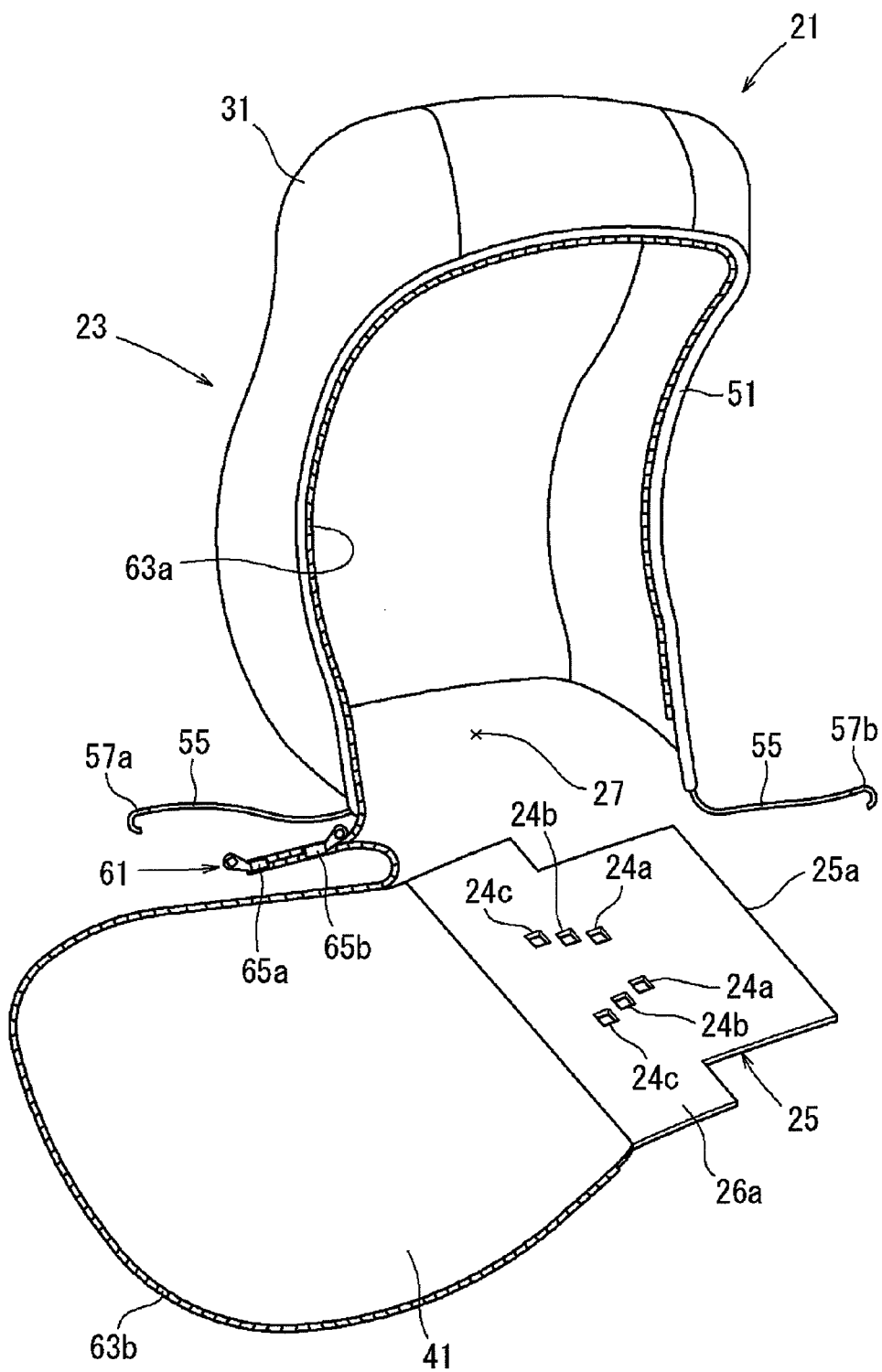
FIG. 3 is a perspective view showing the seat cover according to the exemplary embodiment of the present invention.

As shown in FIG. 3, the cover main body portion 23 includes two constituting parts, a first constituting part 31 and a second constituting part 41 that can be joined and separated by a slide fastener 61. The first constituting part 31 and the second constituting part 41 correspond to the "separately formed parts" of the present invention and the slide fastener 61 corresponds to the "joining unit" of the present invention.

When first constituting part 31 and the second constituting part 41 are the separated state, an improvement in workability can be achieved when covering the seat main body with the cover main body portion 23. That is, in a state in which the slide fastener 61 is operated to at least partly separate the first constituting part 31 and the second constituting part 41, covering the seat main body with the cover main body portion 23, and then, by operating the slide fastener 61 to bond the first constituting part 31 and the second constituting part 41, the cover main body portion 23 can be easily mounted on the seat main body. In the seat cover 21, after the slide fastener 61 is in the joining state, the slide fastener 61 is covered with a covering member 51 described later. Thus, the joining state of the first constituting part 31 and the second constituting part 41 by the slide fastener 61 is not shown in FIGS. 1 and 2, but the position of the covering member 51 generally corresponds to a rail position of the first constituting part 31 and the second constituting part 41. The first constituting part 31 constitutes an outer surface from the front surface of the seat back 15 to the upper part of the rear surface 15b and the front part of the rail portion 15c. As shown in FIG. 1, the second constituting part 41 constitutes an outer surface from the lower end of the rear surface 15b of the seat back 15 to the center portion and the rear part of the rail portion 15c. In the lower part of the second constituting part 41, a lower band portion 25 is integrally provided.

In a state in which the first constituting part 31 and the second constituting part 41 are joined to each other by the slide fastener 61, the seat cover 21 is the shape of a bag and an opening 27 (see FIG. 3) is formed in the lower portion thereof. The rail position of the first constituting part 31 and the second constituting part 41 joined by the slide fastener 61 is an annular shape with ends in which end edges of the opening 27 are end portions. The slide fastener 61 is a part of the related art that can separate and engage engaging parts of opposing fastener pieces 63a and 63b by the sliding movement of a slide tool, thereby making it possible to separate and bond the first constituting part 31 and the second constituting part 41. The slide fastener 61 of the present embodiment includes two slide tools 65a and 65b, at the position between the slide tools 65a and 65b, the slide fastener 61 is engaged with the engaging part and becomes the joining state, and the slide fastener 61 becomes the separation state from each slide tool 65a and 65b to both end portions of the fastener pieces 63a and 63b.

The description will be given for an example of a preferable operation method of mounting the cover main body portion 23 with the structure described above on the seat main body. First of all, as shown in FIG. 3, by making both of the slide tools 65a and 65b closer to one end of the fastener pieces 63a and 63b, the fastener pieces 63a and 63b are separated over substantially the whole length and the second constituting part 41 is completely separated from the first constituting part 31. Furthermore, the first constituting part 31 covers the seat main body, the slide tool 65b is slid and the fastener pieces 63a and 63b are engaged over the whole length, whereby the first constituting part 31 is joined to the second constituting part 41. As a result, it is possible to mount the cover main body portion 23 on the seat main body.

The description will be given for another example of a preferable operation method of mounting the cover main body portion 23 on the seat main body. First of all, the slide tools 65a and 65b are separated at the center of the fastener pieces 63a and 63b, the second constituting part 41 is joined to the first constituting part 31 at the upper part and is separated at both side portions. That is, the cover main body portion 23 is formed so that two slits are formed in the up and down direction from the opening portion 27. In addition, the seat main body is inserted from the opening portion 27, the cover main body portion 23 covers the seat main body, the slide tools 65a and 65b are separated and the fastener pieces 63a and 63b are engaged over the whole length. As a result, the slits are closed and the cover main body portion 23 is mounted on the seat main body.

Figure 4:
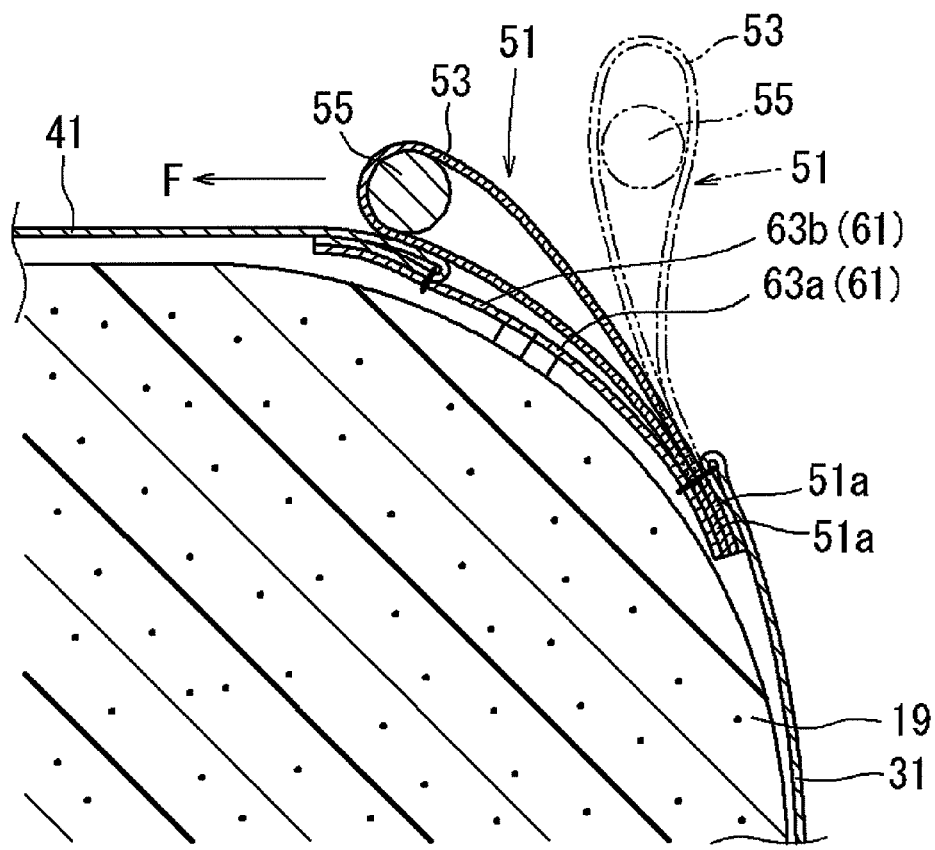
FIG. 4 is a sectional view taken from line IV-IV of the vehicle seat shown in FIG. 2.

The description will be given for the structure in which the covering member 51 covers the slide fastener 61 that is in the joining state. The covering member 51 has the shape of a band and is disposed so as to trace an annular shape on the outer surface of the seat back 15. The disposition path of the covering member 51 has the annular shape that forms a smooth curve in a certain direction. As shown in FIG. 4, the covering member 51 is disposed along the slide fastener 61 in the first constituting part 31 situated at the outer side of the annular-shaped disposition position. The covering member 51 is configured such that the end portions 51a and 51a along a longitudinal direction of a band-shaped fabric material are overlapped and become a loop shape and the overlapped end portions 51a and 51a are sewn to the end portion of the first constituting part 31 together with the fastener pieces 63a. As a result, a loop-shaped portion 53 is provided so as to be able to overhang in the direction of the inner second constituting part 41. The size of the overhang is a size capable of at least covering the slide fastener 61. A string-shaped member 55 is inserted into the loop-shaped portion 53 of the covering member 51. That is, the loop-shaped portion 53 corresponds to the "inserting structure" of the present invention.

Hooks 57a and 57b are provided at both ends of the string member 55. The string-shaped member 55 is inserted into the covering member 51 disposed in the annular shape, and the hooks 57a and 57b at both end portions thereof come out from the end portion of the covering member 51. For that reason, when both ends of the string-shaped member 55 approach each other and the string-shaped member 55 is tightened, as shown in FIG. 1 or the like, a force F in the direction of the inner side position of the annular-shaped disposition position of the covering member 51 acts on the covering member 51 over the whole length thereof. Thus, as shown by two dotted and dashed lines in FIG. 4, the covering member 51 is rolled up before the string-shaped portion 55 is tightened, but, as shown by solid lines in FIG. 4, in a state in which the string-shaped member 55 is tightened, the covering member 51 covers the slide fastener 61 and overhangs in the direction of the inner side position (in the direction of the second constituting part 41).

Figure 5:
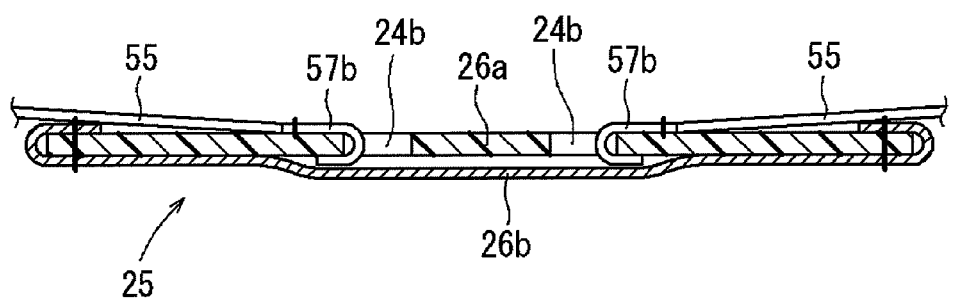
FIG. 5 is a sectional view taken from line V-V of the seat cover shown in FIG. 2.

The hooks 57a and 57b on both end portions are engaged with the lower band portion 25, whereby the string-shaped member 55 can maintain its tightened state. As shown in FIG. 5, the lower band portion 25 is configured such that a plate material formed of a resin such as a polypropylene is used as a core 26a and the surface thereof exposed to the outer surface of the seat is covered with an epidermal material 26b. On the core 26a of the lower band portion 25, engaging holes 24b and 24b are formed. The hooks 57a and 57b catch the edges of the engaging holes 24b and 24b from the rear side, with the result that the string-shaped member 55 is maintained in the tightened state. As a result, a state is maintained in which the covering member 51 covers the slide fastener 61 and overhangs in the direction of the inner side position (the direction of the second constituting part 41).

Due to the seat cover 21 with the structure described above, the following working effect is obtained.

After the cover main body portion 23 has been mounted on the seat main body, by means of an easy operation by which the string-shaped member 55 is tightened and the hooks 57a and 57b of both end portions thereof catch the engaging holes 24b and 24b of the lower band portion 25, it is possible to surely cover the slide fastener 61, which is used when the cover main body portion 23 is mounted on the seat main body, with the covering member 51. Furthermore, as shown in FIG. 1 or the like, in the exemplary embodiment, a plurality of engaging holes 24a, 24a, 24b, 24b, 24c and 24c is provided in the lower band portion 25, and thus, even when there is an error in the size of the length of the string-shaped member 55, by a suitable selection, it is possible to surely engage the string-shaped member 55 in the tightened state.

In addition, as the disposition path of the annular-shaped covering member 51 on the seat surface is provided to span the rear surface 15b and the rail portion 15c, a smooth curve is traced out. As a result, it is possible to reduce differences in curvatures of each fastener piece 63a and 63b of the slide fastener 61 disposed nearby the covering member 51. Thus, it is possible to prevent the appearance from deteriorating due to the rippling of the fastener pieces 63a and 63b.

Furthermore, other various types of embodiments of the present invention can be considered within the scope without departing from the gist thereof.

Although in the embodiment described above, the maintenance of the tightened state of the string-shaped member 55 is performed by engaging the hooks 57a and 57b on either end portion with the lower band portion 25, the maintaining method of the tightened state of the string-shaped member 55 is not limited thereto. For example, by combining both end portions of the string-shaped member 55, the tightened state can be maintained. Furthermore, for example, at either end portion of the string-shaped member 55, the tightened state can be maintained by an inserting fix member attached in a state of inserting both end portions.

Furthermore, while in the above-mentioned embodiment, the slide fastener 61 is disposed in the shape of the wheel corresponding to the overall length of the wheel-shaped disposition place of the covering member 51, there is no need to necessarily dispose the slide fastener with respect to the overall length of the wheel-shaped disposition place of the covering member 51. For example, in a case where the slit capable of expanding the opening portion 27 is provided in the seat cover 21, by disposing the covering member 51 in the shape of wheel including the place where the slit is disposed, the slit joined by the joining means can be covered with the covering member 51.

In addition, the joining means is not limited to the slide fastener, but various joining means, i.e., a fastener of another form such as a surface fastener, a hook and a button or the like can be used.

Furthermore, the present invention is not limited to the seat cover, but can also be applied to a seat cushion.

What is claimed is:

1. A vehicle seat cover comprising:
   separately formed parts that are configured to wrap a seat main body and are joined by a joining unit when mounted on the seat main body, wherein
   a band-shaped covering member is disposed along outer edges of a first part of the separately formed parts of the seat cover to overhang a second part of the separately formed parts and cover the joining unit when the separately formed parts are joined, wherein
   the joining unit is disposed along outer edges of the second part of the separately formed parts of the seat cover at an inner side position of the covering member when the separately formed parts are joined, wherein
   the covering member includes an inserting structure that receives a string-shaped member that extends along the outer edges of the first part of the separately formed parts of the seat cover and is configured to be tightened when the separately formed parts are joined, wherein
   hooks are provided at each end of the string-shaped member such that when the string shared member is received by the inserting structure of the covering member, each hook extends from a respective end of the covering member, wherein
   the first part of the separately formed parts is configured to cover at least a front surface of the seat main body, wherein
   the second part of the separately formed parts is configured to cover at least a rear surface of the seat main body, wherein
   a lower band portion extends from a lower end portion of the second part of the separately formed parts, and includes a plate-like portion having a plurality of engaging holes for removable engagement with the hooks, and wherein
   the first part of the separately formed parts is configured to cover a portion of the seat main body which the second part of the separately formed parts does not cover.

2. The vehicle seat cover of claim 1, wherein the hooks are configured to engage at least one of the plurality of engaging holes of the lower band portion, and when the vehicle seat cover is wrapped around the seat main body, the hooks are engagable with the at least one of the plurality of engaging holes so that the string-shaped member is maintained in a tightened state and the covering member covers the joining unit.

3. The vehicle seat cover of claim 1, wherein an attaching portion is provided at each end of the string-shaped member, and wherein the attaching portion of each end of the string-shaped member is attached to the seat cover so as to maintain the string-shaped member in a tightened state.

4. The vehicle seat cover of claim 1, wherein end portions of the string-shaped member are coupled to each other so as to maintain the string-shaped member in a tightened state.

5. A vehicle seat cover comprising:
   a first cover portion that covers a first part of a seat main body;
   a second cover portion that covers a second part of the seat main body, the second cover portion separately formed from the first cover portion;
   a joining unit that is configured to join and separate the first cover portion and the second cover portion when the first cover portion and the second cover portion are mounted on the seat main body; and
   a covering member that is configured to cover a joining state of the first cover portion and the second cover portion, the covering member disposed along outer edges of the first cover portion, the covering member configured to overhang at least a part of the second cover portion when the first portion cover and the second portion cover are joined, wherein
   the joining unit is disposed along outer edges of the second cover portion at an inner side position of the covering member along a position in which the covering member is disposed, wherein
   the covering member has an inserting structure into which a string-shaped member is inserted, the inserting structure has a part that overhangs the covering member and extends along the outer edges of the first cover portion, wherein hooks are provided at each end of the string-shaped member such that each hook extends from a respective end of the covering member, wherein the first cover portion is configured to cover at least a front surface of the seat main body, wherein the second cover portion is configured to cover at least a rear surface of the seat main body, wherein a lower band portion extends from a lower end portion of the second cover portion, and includes a plate-like portion having a plurality of engaging holes for removable engagement with the hooks, wherein the first cover portion is configured to cover a portion of the seat main body which the second cover portion does not cover, and wherein when the string-shaped member is tightened, the covering member covers the joining state of the first cover portion and the second cover portion.

6. A vehicle seat comprising: the vehicle seat cover of claim 5; and the seat main body.

7. The vehicle seat cover of claim 5, wherein the hooks are configured to engage at least one of the plurality of engaging holes of the lower band portion, and when the vehicle seat cover is wrapped around the seat main body, the hooks are engagable with at least one of the plurality of engaging holes so that the string-shaped member is maintained in a tightened state and the covering member covers the joining unit.

8. The vehicle seat cover of claim 5, wherein an attaching portion is provided at each end of the string-shaped member, and wherein the attaching portion of each end of the string-shaped member is attached to the seat cover so as to maintain the string-shaped member in a tightened state.

9. The vehicle seat cover of claim 5, wherein end portions of the string-shaped member are coupled to each other so as to maintain the string-shaped member in a tightened state.

* * * * *